United States Patent
Zhu

(10) Patent No.: US 11,601,952 B2
(45) Date of Patent: Mar. 7, 2023

(54) METHOD AND APPARATUS FOR SERVICE MULTIPLEXING AND TRANSMISSION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 146 days.

(21) Appl. No.: 16/581,902

(22) Filed: Sep. 25, 2019

(65) Prior Publication Data

US 2020/0022155 A1    Jan. 16, 2020

Related U.S. Application Data

(63) Continuation of application No. PCT/CN2017/082221, filed on Apr. 27, 2017.

(51) Int. Cl.
*H04W 72/12* (2009.01)
*H04W 4/70* (2018.01)
*H04W 72/044* (2023.01)
*H04W 76/27* (2018.01)

(52) U.S. Cl.
CPC ......... *H04W 72/1205* (2013.01); *H04W 4/70* (2018.02); *H04W 72/044* (2013.01); *H04W 76/27* (2018.02)

(58) Field of Classification Search
None
See application file for complete search history.

(56) References Cited

U.S. PATENT DOCUMENTS

| | | | | |
|---|---|---|---|---|
| 2017/0257860 A1* | 9/2017 | Nam | ................. | H04W 72/0446 |
| 2017/0285130 A1* | 10/2017 | Kim | ................. | H04L 5/0044 |
| 2017/0295592 A1* | 10/2017 | Yang | ................. | H04W 72/1263 |
| 2018/0227047 A1* | 8/2018 | Hosseini | ................. | H04B 7/26 |
| 2018/0270816 A1* | 9/2018 | Li | ................. | H04B 7/2656 |
| 2019/0165906 A1* | 5/2019 | Bala | ................. | H04L 27/3488 |

FOREIGN PATENT DOCUMENTS

| | | |
|---|---|---|
| CN | 101247166 A | 8/2008 |
| CN | 101426239 A | 5/2009 |
| CN | 101499997 A | 8/2009 |

(Continued)

OTHER PUBLICATIONS

Vivo "Discussion on DL Multiplexing of eMBB and URLLC", R1-1704499 Apr. 3-7, 2017 (Year: 2017).*

(Continued)

*Primary Examiner* — Jamaal Henson
(74) *Attorney, Agent, or Firm* — Syncoda LLC; Feng Ma

(57) ABSTRACT

A method for service multiplexing and transmission can be applied to a base station. In a case that one type of service is to be sent on a target resource, the base station sends the one type of service based on all resources of the target resource. In a case that multiple types of service are to be sent on the target resource, for each type of service in the multiple types of service, the base station determines a resource pre-allocated to bear the type of service in the target resource, sends the type of service based on the determined resource corresponding to the type of service, and sends service multiplexing indication information to a UE which receives the type of service.

18 Claims, 13 Drawing Sheets

(56) References Cited

FOREIGN PATENT DOCUMENTS

| CN | 102333315 | A | | 1/2012 | |
| CN | 105979597 | A | | 9/2016 | |
| WO | WO-2018147977 | A1 | * | 8/2018 | ............ H04L 5/0007 |

OTHER PUBLICATIONS

International Search Report in the international application No. PCT/CN2017/082221, dated Dec. 27, 2017.
Written Opinion of the International Search Authority in the international application No. PCT/CN2017/082221, dated Dec. 27, 2017.
Huawei, R1-1611222 DL URLLC multiplexing considerations, 3GPP TSG RAN WG1 Meeting #87, issued on Nov. 5, 2016(Nov. 5, 2016), sections 1-3.
Intel Corporation, R1-1612003 Downlink URLLC transmission and multiplexing with eMBB, 3GPP TSG RAN WG1 Meeting #87, issued on Nov. 6, 2016(Nov. 6, 2016), entire document.
First Office Action of the Chinese application No. 201780000259.8, dated Jun. 2, 2020.
ETRI:"Discussion on NR reserved resources", 3GPP Draft; R1-1700584,Discussion on NR Reserved Resources, vol. RAN WG1, No. Spokane, USA; Jan. 16, 2017-Jan. 20, 2017 Jan. 16, 2017 (Jan. 16, 2017),XP051208113.
First Office Action of the European application No. 17906837.4, dated May 17, 2021.
CMCC: "Discussion on eMBB/URLLC multiplexing", 3GPP Draft; R1-1703409, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 13, 2017-Feb. 17, 2017 Feb. 12, 2017 (Feb. 12, 2017), XP051210537, Retrieved from the Internet: URL:http://www.3gpp.org/ftp/Meetings_3GPP_SYNC/RAN1/Docs/ [retrieved on Feb. 12, 2017] * Sections 1-2 *.
Guangdong OPPO Mobile Telecom: "DL control channel design for URLLC", 3GPP Draft; R1-1704619, 3rd Generation Partnership Project (3GPP), Mobile Competence Centre; 650, Route Des Lucioles; F-06921 Sophia-Antipolis Cedex; France, vol. RAN WG1, No. Spokane, Washington, USA; Apr. 3, 2017-Apr. 7, 2017 Apr. 2, 2017 (Apr. 2, 2017), XP051242758, Retrieved from the Internet: URL:http//www.3gpp.org/ftp/Meetings_3GPP_SYNC/RAN1/Docs/ [retrieved on Apr. 2, 2017] * Sections 1-2 *.
Fujitsu: "Discussion on Preemption Indicator Design", 3GPP Draft; R1-1704482 Discussion on Preemption Indicator Design Final, 3rd Generation Partnership Project (3GPP), Mobile Competence Centre; 650, Route Des Lucioles ; F-06921 Sophia-Antipolis Cedex; , vol. RAN WG1, No. Spokane, USA Apr. 3, 2017-Apr. 7, 2017 Apr. 2, 2017 (Apr. 2, 2017), XP051242626, Retrieved from the Internet: URL:http://www.3gpp.org/ftp/Meeiings_3GPP_SYNC/RAN1/Docs/ [retrieved on Apr. 2, 2017] * Sections 1-2 *.
"3rd Generation Partnership Project; Technical Specification Group Radio Access Network; Study on New Radio Access Technology Physical Layer Aspects (Release 14)", 3GPP Standard; Technical Report ; 3GPP TR 38.802, 3rd Generation Partnership Project (3GPP), Mobile Competence Centre ; 650, Route Des Lucioles; F-06921 Sophia-Antipolis Cedex ; France, vol. RAN WG1 , No. V14.0.0, Mar. 25, 2017 (Mar. 25, 2017), pp. 1-143, XP051297632, [retrieved on Mar. 25, 2017] * Subsections 6.1.2 and 6.2.1 *.
Supplementary European Search Report in the European application No. 17906837.4, dated Feb. 24, 2020.

* cited by examiner

METHOD AND APPARATUS FOR SERVICE MULTIPLEXING AND TRANSMISSION

CROSS-REFERENCE TO RELATED APPLICATIONS

This application is a continuation of PCT/CN2017/082221 filed on Apr. 27, 2017, the disclosure of which is hereby incorporated by reference in its entirety.

BACKGROUND

For meeting user service requirements, a communication system is usually required to support various types of services, for example, the enhanced mobile broad band (eMBB) service, the ultra-reliable low latency communication (URLLC) service, and the massive machine type communication (mMTC) service. When various types of services are to be transmitted, multiplexing transmission is performed on the various types of services in the communication system. That is, various types of service are transmitted on the same operation frequency band, to meet performance requirements of different services, such as high rate, low latency etc.

SUMMARY

The present disclosure relates to the technical field of communications, and more particularly to a method and a device for service multiplexing and transmission.

According to some embodiments of the disclosure, a method and device for service multiplexing and transmission and a computer-readable storage medium are provided.

In a first aspect, a method for service multiplexing and transmission is provided, which is applied to a base station and includes operations as follows.

In response to that one type of service is to be sent on a target resource, the one type of service is sent based on all resources of the target resource. The target resource is a pre-configured resource capable of bearing multiple types of service.

In response to that multiple types of service are to be sent on the target resource, for each type of service of the multiple types of service, a resource pre-allocated to bear the type of service is determined in the target resource, and the type of service is sent based on the determined resource corresponding to the type of service, and service multiplexing indication information is sent to a user equipment (UE) which receives the type of service.

The service multiplexing indication information is used to indicate a type of the service which is sent by the base station on the target resource.

In a second aspect, a method for service multiplexing and transmission is provided, which is applied to a user equipment (UE) and includes operations as follows.

In response to that no service multiplexing indication information sent by a base station is received, or the service multiplexing indication information is received and it is determined based on the service multiplexing indication information that the base station sends one type of service on a target resource, the one type of service is received based on all resources of the target resource. The target resource is a resource pre-configured by the base station and capable of bearing multiple types of service.

In response to that the service multiplexing indication information sent by the base station is received and it is determined based on the service multiplexing indication information that the base station sends multiple types of service on the target resource, the resource used for the service which is sent to the UE by the base station is determined in the target resource, and a type of service is received on the determined resource corresponding to the type of service.

In a third aspect, a device for service multiplexing and transmission is provided, which includes:

a processor; and a memory configured to store a processor-executable instruction.

The processor is configured to: in response to that one type of service is to be sent on a target resource, send the one type of service based on all resources of the target resource, with the target resource being a pre-configured resource capable of bearing multiple types of service; and in response to that multiple types of service are to be sent on the target resource, for each type of service in the multiple types of service, determine a resource pre-allocated to bear the type of service in the target resource, send the type of service based on the determined resource corresponding to the type of service, and send service multiplexing indication information to a user equipment (UE) which receives the type of service. The service multiplexing indication information is used to indicate a type of a service, which is sent by the base station on the target resource.

BRIEF DESCRIPTION OF THE DRAWINGS

In order to describe the technical solutions in the embodiments of the present disclosure more clearly, the accompanying drawings required for descriptions about the embodiments will be simply introduced below. It is apparent that the accompanying drawings described below only show some embodiments of the present disclosure. Those of ordinary skill in the art can further obtain other accompanying drawings according to these accompanying drawings without creative work.

DETAILED DESCRIPTION

Reference will now be made in detail to various embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of devices and methods consistent with aspects related to the disclosure as recited in the appended claims.

The terminology used herein is for the purpose of describing particular examples only and is not intended to be limiting of examples. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

In a method for service multiplexing and transmission, different resources can be allocated to different types of service respectively, and a type of service is transmitted on the allocated resources corresponding to the type of service. The resources include time-domain resources or frequency-domain resources. With taking a case that a frequency-domain resource is allocated as an example, it is assumed that a communication system supports two types of service including the eMBB service and the URLLC service.

Figure 1A:
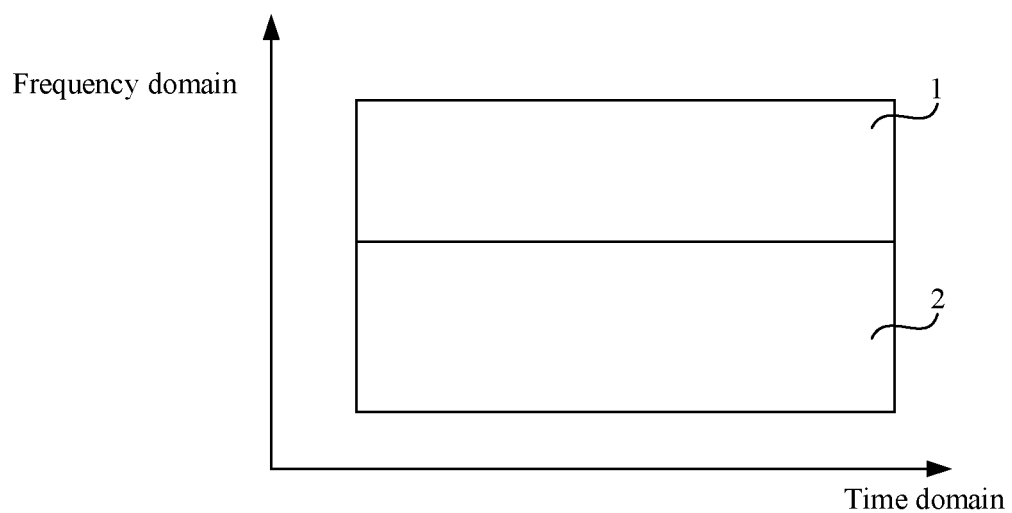
FIG. 1A is a schematic diagram illustrating allocation of a target resource according to some embodiments of the present disclosure.

Referring to FIG. 1A, an upper frequency-domain resource 1 in the frequency-domain resources shown in FIG. 1A can be allocated to the eMBB service, and a lower frequency-domain resource 2 can be allocated to the URLLC service. As such, the upper frequency-domain resource 1 may only be configured to bear the eMBB service, and the lower frequency-domain resource 2 may only be configured to bear the URLLC service.

The system can transmit service multiplexing indication information, which is indication information defined and configured in the embodiments of the present disclosure, which can be sent to a user equipment (UE) by a base station in a process of sending a service, and is used to indicate a type of the service which is sent by the base station of the UE on a target resource.

Target resource is a resource pre-configured by the base station and capable of bearing multiple types of service, which can include a frequency-domain resource and/or a time-domain resource. That is, the target resource can be a resource determined by the frequency-domain resource, or a resource determined by the time-domain resource or a resource determined by both the frequency-domain resource and the time-domain resource. For example, the target resource can include certain frequency-domain units in the frequency domain, for example, one or more REs, RBs or other granularities of frequency-domain resources. The target resource can include certain time-domain units in the time domain, for example, one or more symbols, mini-slots, slots, subframes, radio frames or other granularities of time-domain resources.

Various embodiments of the present disclosure can be applied to a scenario where a communication system supports multiple types of service and performs multiplexing transmission on the multiple types of service, that is, the communication system transmits the multiple types of service on the same operation frequency band. In the related art, different resources may be allocated to different types of service, respectively, and the allocated resource is only used to bear the type of service corresponding to the resource. However, with such a static resource allocation method, the resources allocated to other types of service may become idle in a case that only one type of service is to be transmitted, which results in a relatively low resource utilization rate.

To solve the problem of low resource utilization rate in some systems, a method for service multiplexing and transmission is provided according to some embodiments of the disclosure. A service multiplexing and transmission scenario of the method can include a sending scenario at a base station side and a receiving scenario at a UE side.

The scenario at the base station side includes: a scenario in which one type of service is sent using a target resource; a scenario in which multiple types of service are sent using the target resource; and a scenario in which other type of service is also sent in a process of sending one type of service on the target resource.

The scenario at the UE side includes: a scenario in which one type of service is received on a target resource; a scenario in which multiple types of service are received on the target resource; and a scenario in which, in response to that it is determined that a base station is to send other type of service on the target resource in a process of receiving one type of service on the target resource, the service is continued to be received.

Finally, an implementation environment of the embodiments of the present disclosure is introduced.

Figure 1B:
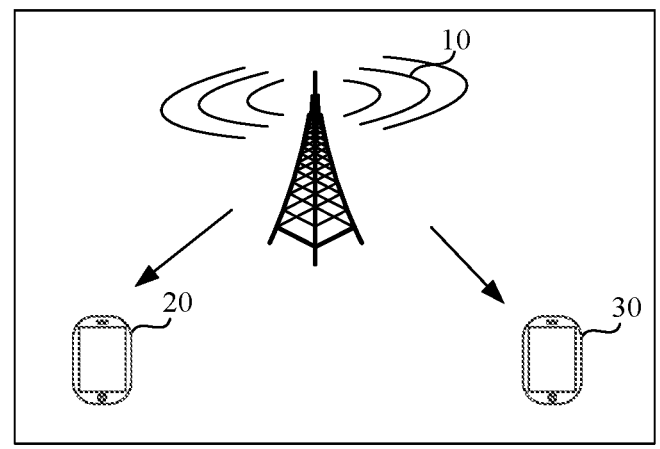
FIG. 1B is a schematic diagram illustrating a communication system according to some embodiments of the present disclosure.

The embodiments of the present disclosure are applied to a communication system. FIG. 1B is a schematic diagram illustrating a communication system according to an exemplary embodiment. As shown in FIG. 1B, the communication system includes a base station 10 and two UEs, and the two UEs are UE 20 and UE 30 respectively. The base station can be connected with the UE 20 and the UE 30 through a communication network, and the base station 10 can transmit a service to the UE 20 and a UE 30 on a target resource.

If the base station 10 is to send one type of service to the UE 20 or the UE 30 on the target resource, the base station 10 can send the one type of service based on all resources of the target resource.

If the base station 10 is to send multiple types of service on the target resource, the base station 10 can, for each type of service in the multiple types of service, determine a resource pre-allocated to bear the type of service in the target resource, send the type of service based on the determined resource corresponding to the type of service, and send service multiplexing indication information to the UE which receives the type of service, to indicate that the base station sends multiple types of service on the target resource.

If the base station 10 is to send other type of service on the target resource in a process of sending the one type of service, the base station 10 can determine a first resource and a second resource in the target resource. The first resource is a resource in the target resource except the second resource. In response to that the second resource is the resource pre-allocated to bear the other type of service in the target resource, the base station 10 can continue sending the one type of service based on the first resource, and send the other type of service based on the second resource, and send the service multiplexing indication information to a UE which receives the one type of service and a UE which receives the other type of service. In response to that the second resource is a resource scheduled for the other type of service in the target resource, the base station 10 can continue sending the one type of service based on the first resource, and send the other type of service based on the second resource, send the service multiplexing indication information to the UE which receives the one type of service and send resource scheduling indication information to the UE which receives the other type of service.

Figure 1C:
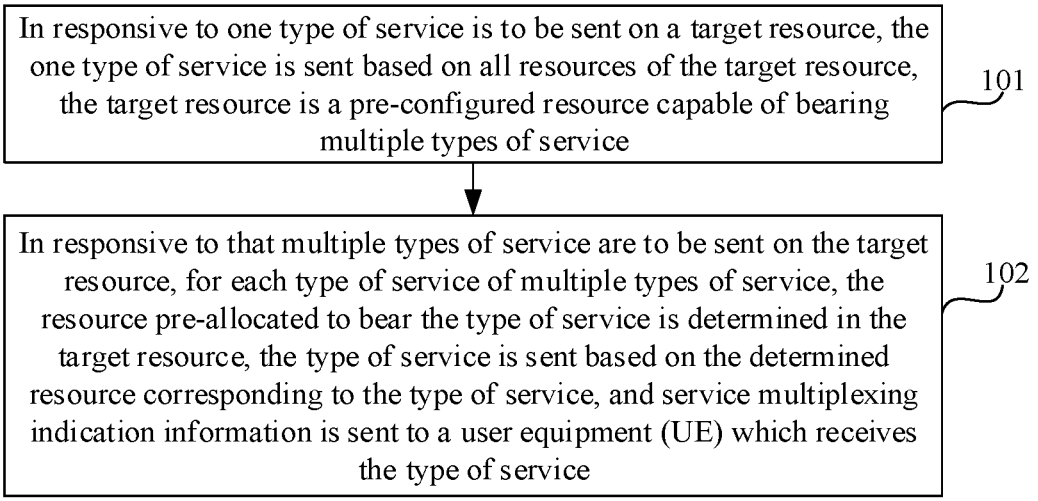
FIG. 1C is a flowchart showing a method for service multiplexing and transmission according to some embodiments of the present disclosure.

FIG. 1C is a flowchart showing a method for service multiplexing and transmission according to an exemplary embodiment. The method is applied to a base station. Referring to FIG. 1C, the method includes blocks 101 to 102.

In block 101, in response to that one type of service is to be sent on a target resource, the one type of service is sent based on all resources of the target resource. The target resource is a pre-configured resource capable of bearing multiple types of services.

In block 102, in response to that multiple types of service are to be sent on the target resource, for each type of service in the multiple types of service, a resource pre-allocated to bear the type of service is determined in the target resource, the type of service is sent based on the determined resource corresponding to the type of service, and service multiplexing indication information is sent to a UE which receives the type of service.

The service multiplexing indication information is used to indicate a type of the service, which is sent which is by the base station on the target resource.

In the embodiment of the present disclosure, in response to the base station is to send only one type of service, all the resources of the target resource can be used for sending the only one type of service. In response to that multiple types of service are to be sent, for each type of service, a resource pre-allocated to bear the type of service can be determined in the target resource, the type of service is sent based on the determined resource corresponding to the type of service, and the service multiplexing indication information is sent to the UE which receives the type of service, so that the UE receives the service on the resource corresponding to the service. In such a manner, occupied resources can be dynamically regulated according to the number of types of sent services, thereby avoiding the resources from being idle, and improving a utilization rate of the resources.

In some embodiments, after the one type of service is to be sent on the target resource, the method further includes operations as follows.

In response to that other type of service is to be sent on the target resource in a process of sending the one type of service, a first resource and a second resource are determined in the target resource.

The first resource is a resource in the target resource except the second resource, and the second resource is a resource pre-allocated to bear the other type of service in the target resource.

The one type of service is continued to be sent based on the first resource, the other type of service is sent based on the second resource, and service multiplexing indication information is sent to a UE which receives the one type of service and a UE which receives the other type of service.

In some embodiments, after the one type of service is to be sent on the target resource, the method further includes operations as follows.

In response to that other type of service is to be sent on the target resource in the process of sending the one type of service, a first resource and a second resource are determined in the target resource.

The first resource is a resource in the target resource except the second resource, and the second resource is the resource scheduled for the other type of service in the target resource.

The one type of service is continued to be sent based on the first resource, the other type of service is sent based on the second resource, service multiplexing indication information is sent to a UE which receives the one type of service, and resource scheduling indication information is sent to a UE which receives the other type of service.

In some embodiments, the service multiplexing indication information is further used to indicate that the base station sends the other type of service on the target resource.

In some embodiments, after the operation that the one type of service is sent based on all the resources of the target resource, the method further includes an operation as follows.

The service multiplexing indication information is sent to a UE which receives the one type of service.

In some embodiments, the target resource includes a frequency-domain resource and/or a time-domain resource.

In some embodiments, the service multiplexing indication information is sent to the UE which receives the type of service through system information, high-layer signaling, physical-layer signaling or a protocol. The high-layer signaling includes RRC signaling and MAC signaling.

All of the above optional technical solutions can be freely combined into optional embodiments of the present disclosure, which are not described repeatedly in the embodiments of the present disclosure.

Figure 2:
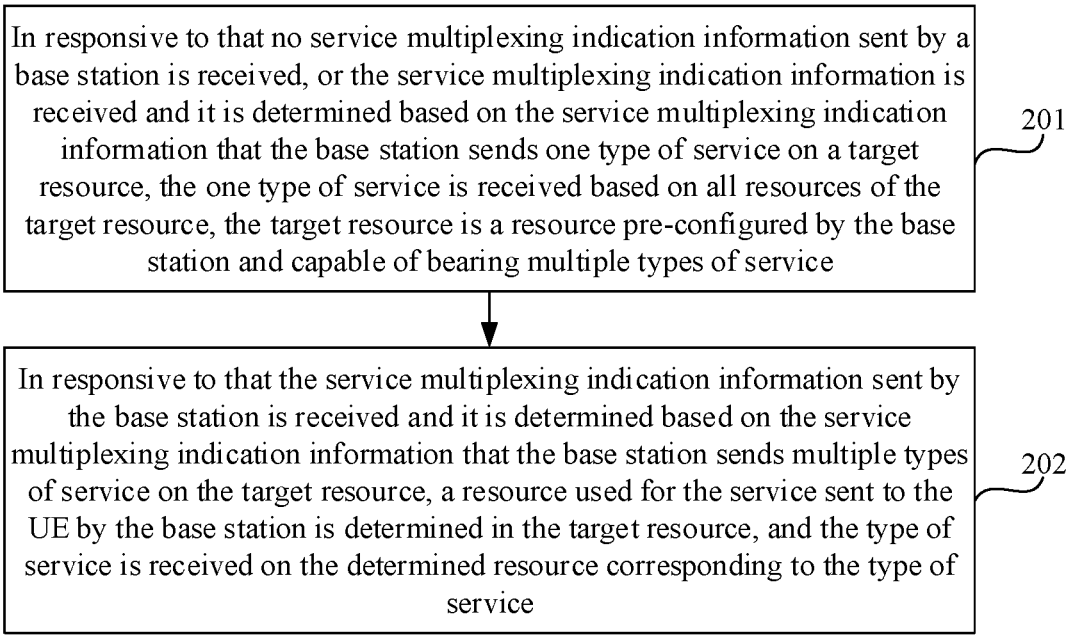
FIG. 2 is a flowchart showing a method for service multiplexing and transmission according to some embodiments of the present disclosure.

FIG. 2 is a flowchart showing a method for service multiplexing and transmission according to an exemplary embodiment. The method is applied to a user equipment. Referring to FIG. 2, the method includes blocks 201 to 202.

In block 201, in response to that no service multiplexing indication information sent by a base station is received or the service multiplexing indication information is received and it is determined based on the service multiplexing indication information that the base station sends one type of service on a target resource, the one type of service is received based on all resources of the target resource, the target resource is a resource pre-configured by the base station and capable of bearing multiple types of service.

In block 202, in response to that the service multiplexing indication information sent by the base station is received and it is determined based on the service multiplexing indication information that the base station sends multiple types of service on the target resource, a resource used for the service which is sent to the UE by the base station is determined in the target resource, and the type of service is received on the determined resource corresponding to the type of service.

In the embodiment of the present disclosure, in response to that the base station is to send only one type of service, the UE can receive the one type of the service based on all resources of the target resource. In response to that the base station is to send multiple types of service, the UE can determine a resource used for the service which is sent to the UE by the base station in the target resource and receive the type of service on the determined resource corresponding to the type of service. In such a manner, the base station can dynamically regulate occupied resources according to the number of types of sent services, thereby avoiding the resources from being idle, and improving a utilization rate of the resources.

In some embodiments, the method further includes operations as follows.

In response to that, in a process of receiving the one type of service based on all the resources of the target resource, the service multiplexing indication information sent by the base station is received, or the service multiplexing indication information is received and it is determined based on the service multiplexing indication information that the base station also sends other type of service on the target resource, a first resource and a second resource are determined in the target resource.

The first resource is a resource in the target resource except the second resource, and the second resource is a resource pre-allocated to bear other type of service in the target resource or a resource scheduled for other type of service in the target resource.

The one type of service is continued to be received based on the first resource.

In some embodiments, after the operation that the first resource and the second resource are determined in the target resource, the method further includes an operation as follows.

In response to that the other type of service is the service which is sent to the UE by the base station, the other type of service is received based on the second resource in a process of continuing receiving the one type of service based on the first resource.

In some embodiments, the target resource includes a frequency-domain resource and/or a time-domain resource.

In some embodiments, the service multiplexing indication information is received through system information, high-layer signaling, physical-layer signaling or a protocol. The high-layer signaling includes wireless resource control (RRC) signaling and media access control (MAC) signaling.

All of the above optional technical solutions can be freely combined into optional embodiments of the present disclosure, which will not be described repeatedly in the embodiments of the present disclosure.

Figure 3A:
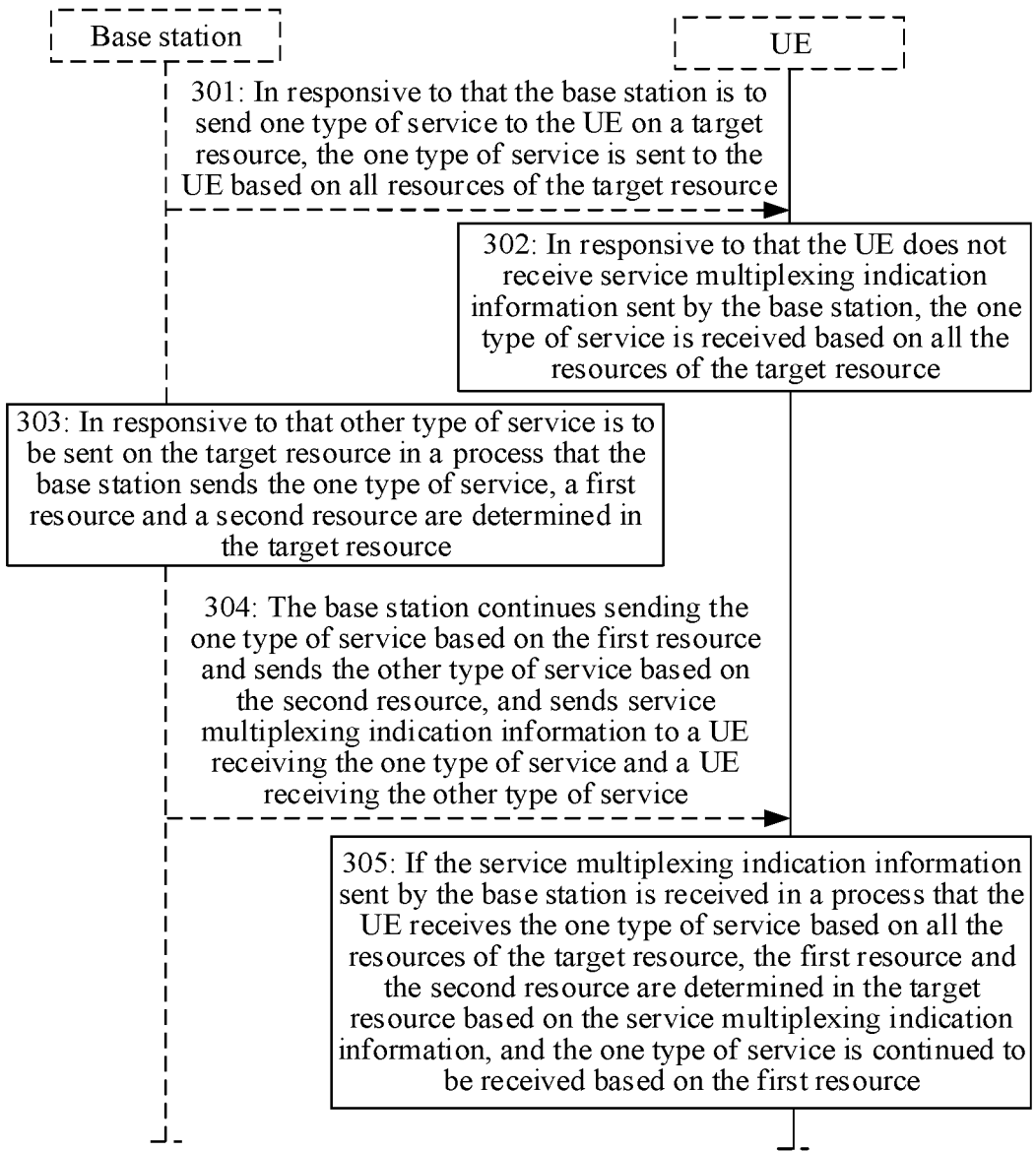
FIG. 3A is a flowchart showing a method for service multiplexing and transmission according to some embodiments of the present disclosure.

FIG. 3A is a flowchart showing a method for service multiplexing and transmission according to an exemplary embodiment. Interaction bodies in the method are a base station and a UE respectively. Referring to FIG. 3A, the method includes blocks 301 to 305.

In block 301, in response to that the base station is to send one type of service to the UE on a target resource, the one type of service is sent to the UE based on all resources of the target resource. The target resource is a pre-configured resource capable of bearing multiple types of service.

The type refers to a type of a service, and the one type of service can be an eMBB service, a URLLC service, an mMTC service or the like.

The operation that the one type of service is sent to the UE based on all resources of the target resource refers to an operation that the base station can send the one type of service using all the resources of the target resource, rather than an operation in the related art that the type of service can only be sent on the resource corresponding to the type of service under the limitation of the resource for each type of service.

In the embodiment of the present disclosure, the base station can send the one type of service on a part or all of the resources of the target resource based on a requirement of the service, and the resources for sending the one type of service can be preset and can also be scheduled by the base station, which will not be limited in the embodiment of the present disclosure.

Figure 3B:
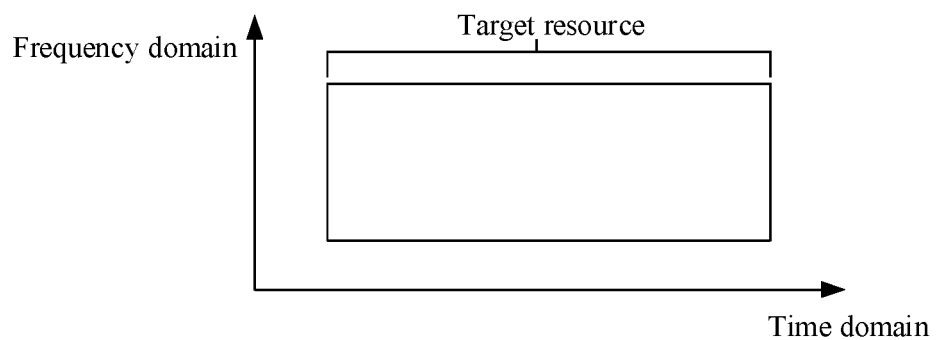
FIG. 3B is a schematic diagram illustrating a target resource according to an exemplary embodiment.

For convenient description, a case that the base station sends the one type of service on all the resources of the target resource is taken as an example below. For example, it is assumed that the one type of service is the eMBB service and the target resource is a time-domain resource shown in FIG. 3B. In combination with FIG. 1B, if the base station 1 is only to send the eMBB service to only UE 2, the eMBB service can be sent to the UE 2 on all resources of the time-domain resource.

In block 302, in response to that no service multiplexing indication information sent by the base station is received by the UE, the one type of service is received based on all the resources of the target resource.

In the embodiment of the present disclosure, the service multiplexing indication information is used to indicate that the base station sends multiple types of service on the target resource and indicate the type of the service which is sent on the target resource. That is, when the base station is to send the multiple types of service on the target resource, the service multiplexing indication information is sent. In a case that only one type of service is to be sent, no service multiplexing indication information is sent.

The service multiplexing indication information includes the type of the service which is sent by the base station, the service multiplexing indication information can be information having a preset length, and the preset length can be preset by the base station or set by negotiation between the base station and the UE. For example, the preset length can be 1 bit, 2 bit, etc.

For example, if the base station supports two types of service, a first type can be indicated by 0, and a second type can be indicated by 1. If a content of the service multiplexing indication information includes 0, it is indicated that the base station is to send the first type of service on the target resource. If the content includes 1, it is indicated that the base station is to send the second type of service on the target resource. When the content is 0 and 1, it is indicated that the base station is to send the first type of service and the second type of service on the target resource respectively.

Exemplarily, if the base station supports four types of service, a first type can also be indicated by 00, a second type can be indicated by 01, a third type can be indicated by 10 and a fourth type can be indicated by 11. If the content of the service multiplexing indication information includes 00, it is indicated that the base station is to send the first type of service on the target resource. When the content includes 00 and 01, it is indicated that the base station is required to send the first type of service and the second type of service on the target resource.

If the UE determines that the base station is to send one type of service to the UE and no service multiplexing indication information sent by the base station is received, it is indicated that the base station is to send only one type of service on the target resource, and the UE can receive the one type of service based on all the resources of the target resource.

In addition, the service multiplexing indication information can be sent to the UE which receives the type of service through system information, high-layer signaling, physical-layer signaling, a protocol or the like. The high-layer signaling includes radio resource control (RRC) and media access control (MAC) signaling and the like. A manner of sending the service multiplexing indication information is not limited in the embodiment of the present disclosure.

Moreover, the base station can also notify a time-frequency resource for the service multiplexing indication information to the UE in advance. That is, a time-frequency position where the service multiplexing indication information is received is notified to the UE in advance. Furthermore, the time-frequency resource for the service multiplexing indication information can also be notified to the UE by the base station through system information, high-layer signaling, a MAC CE, physical-layer signaling, a protocol or the like. A manner of notifying the time-frequency resource for the service multiplexing indication information is also not limited in the embodiment of the present disclosure.

Exemplarily, the multiplexing indication information can be carried through a certain domain in a physical downlink control channel (PDCCH) for public information transmission. For example, the multiplexing indication information is carried at a fixed position in an information domain, and can also be carried independently on a certain channel.

In addition, the UE can determine according to a service notification sent by the base station in advance that the base station is to send one type of service to the UE. That is, the base station, before sending a service to each UE, can send a service notification to the UE. The service notification is used to indicate that the base station is to send the service to the UE and indicate a type of the service to be sent. The UE, after receiving the service notification, can prepare to receive the service in response to the service notification.

In block 303, in response to that other type of service is to be sent on the target resource in a process that the base station sends the one type of service, a first resource and a second resource are determined in the target resource. The first resource is a resource in the target resource except the second resource, and the second resource is a resource pre-allocated to bear the other type of service in the target resource.

The base station can pre-allocate a resource corresponding to each type of service in the target resource, and the allocated resource is used to bear the type of service corresponding to the allocated resource. With taking a case of allocating time-domain resources as an example, if the target resource includes time-domain resources shown in FIG. 3C, the time-domain resource 3 can be pre-allocated to the eMBB service, and the time-domain resource 4 can be pre-allocated to the URLLC service.

If other type of service is to be sent on the target resource, that is, a new service is to be sent, in the process that the base station sends the one type of service, a resource, i.e., the second resource, pre-allocated to bear the other type of service can be determined in the target resource, and a resource in the target resource except the second resource is determined as the first resource.

In block 304, the base station continues sending the one type of service based on the first resource and sends the other type of service based on the second resource, and sends service multiplexing indication information to a UE which receives the one type of service and a UE which receives the other type of service.

If the UE which receives the one type of service and the UE which receives the other type of service are different UEs, the base station sends the service multiplexing indication information to different UEs respectively. If the UE which receives the one type of service and the UE which receives the other type of service are the same UE, the base station sends service multiplexing indication information to the same UE.

Figure 3C:
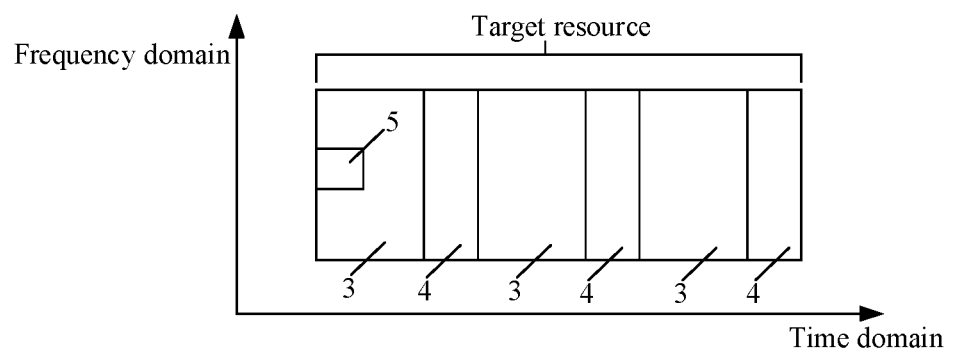
FIG. 3C is a schematic diagram illustrating a target resource according to some embodiments of the present disclosure.

For example, if the base station is to send the URLLC service in a process of sending the eMBB service on all the time-domain resources shown in FIG. 3C, the time-domain resource 4 pre-allocated to bear the URLLC service can be determined in all the time-domain resources, and the other resource, i.e., the time-domain resource 3, is determined as the resource used to bear the eMBB service. Then, the eMBB service can be continued to be sent on the time-domain resource 3, and the new URLLC service is sent on the time-domain resource 4.

In addition, the time-frequency resource used for the service multiplexing indication information can also be arranged on the target resource. That is, the base station can send the service multiplexing indication information on a specified resource of the target resource. For example, as shown in FIG. 3C, the base station can send the service multiplexing indication information on a time-domain resource 5.

Moreover, the service multiplexing indication information can further be used to indicate that the base station sends other type of service on the target resource, that is, used to indicate that a new type of service is transmitted. Furthermore, in the embodiment of the present disclosure, the base station can send the service multiplexing indication information in response to that the other type of service is to be transmitted, and does not send the service multiplexing indication information in response to that no other type of service is to be transmitted.

In block 305, if the service multiplexing indication information sent by the base station is received in a process that the UE receives the one type of service based on all the resources of the target resource, the first resource and the second resource are determined in the target resource based on the service multiplexing indication information, and the one type of service is continued to be received based on the first resource.

Upon the UE receives the service multiplexing indication information, since the service multiplexing indication information is used to indicate that the base station sends multiple types of service on the target resource, the UE can determine that the base station is to send other type of service on the target resource, besides the one type of service. Moreover, the service multiplexing indication information further includes the type of the one type of service, and the UE can determine a second resource pre-allocated to bear the other type of service and a first resource in the target resource except the second resource based on the service multiplexing indication information, and continue receiving the one type of service based on the first resource.

The UE can determine the second resource pre-allocated to bear the other type of service in the target resource according to a stored resource allocation list. Multiple types of service and allocated resources corresponding to the multiple types of service are stored in the resource allocation list. The resource allocation list is sent to the UE after the base station pre-allocates the resources correspondingly to the multiple types of service in the target resource.

It is to be noted that since only a case that the other type of service is sent to other UE by the base station is taken as an example in block 305, the UE only continues receiving based on the first resource, the one type of service rather than the other type of service, that is, the UE continues receiving the one type of service on a resource obtained by hopping the resource occupied by the other type of service in the resource originally used for receiving the one type of service.

For convenient description, the UE which receives the one type of service is called first UE and the UE which receives the other type of service is called second UE hereinafter. For the second UE, when the second UE determines that the base station is to send the other type of service to the second UE and receives the service multiplexing indication information sent by the base station, the second resource pre-allocated to bear the other type of service can be determined, and the other type of service is received based on the second resource.

In another embodiment, after the operation that the first resource and the second resource are determined in the target resource, the method further includes an operation as follows. If the other type of service is also sent to the UE by the base station, the UE receives the other type of service based on the second resource in a process of continuing receiving the one type of service based on the first resource.

In the embodiment of the present disclosure, in response to that the base station is to send only one type of service, all the resources of the target resource can be used for sending the only one type of service. In response to that other type of service is to be sent, the second resource used to bear the other type of service and the first resource in the target resource except the second resource can be determined in the target resource. The one type of service is continued to be sent based on the first resource, and the other type of service is sent based on the second resource, the service multiplexing indication information is sent to the UE which receives the service, so that the UE receives the service on the resource corresponding to the service. As such, different types of service can be dynamically transmitted on the same operation frequency band, thereby effectively improving a utilization rate of resources.

Figure 3D:
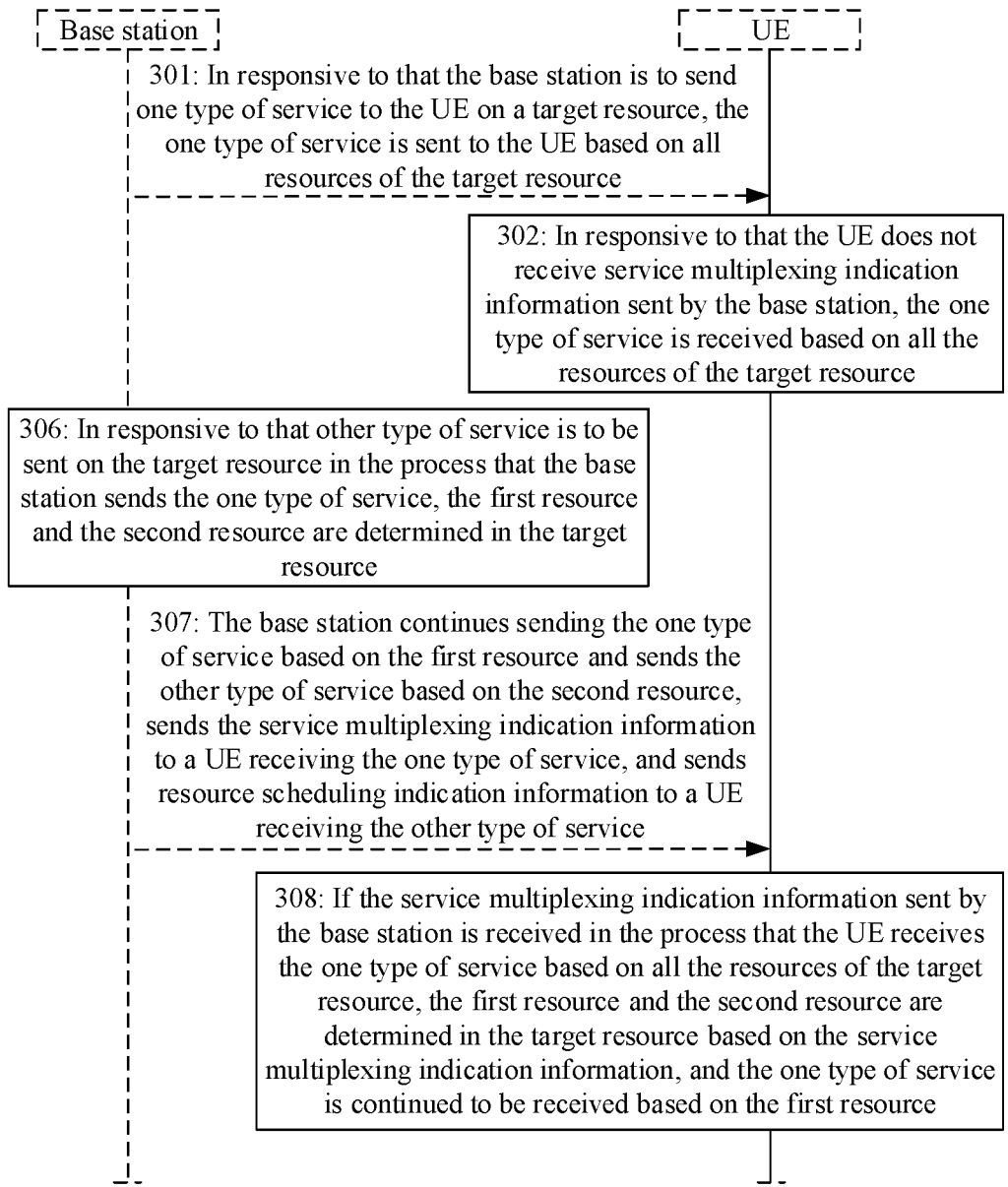
FIG. 3D is a flowchart showing a method for service multiplexing and transmission according to some embodiments of the present disclosure.

It is to be noted that only a case that, in response to that the base station is to send other type of service, the service pre-allocated to bear the other type of service is determined in the target resource and the other type of service is sent on the allocated resource is taken as an example in FIG. 3A. In another embodiment, in response to that the base station is to send the other type of service, the base station can also randomly schedule a resource for the other type of service in the target resource and send the other type of service on the scheduled resource. That is, as shown in FIG. 3D, blocks 303 to 305 in the embodiment shown in FIG. 3A can also be replaced with blocks 306 to 308 below respectively.

In block 306, in response to that other type of service is to be sent on the target resource in the process that the base station sends the one type of service, the first resource and the second resource are determined in the target resource. The first resource is a resource in the target resource except the second resource, and the second resource is a resource scheduled for the other type of service in the target resource.

That is, the second resource is determined in a scheduling manner, rather than being pre-allocated.

In block 307, the base station continues sending the one type of service based on the first resource and sends the other type of service based on the second resource, sends the service multiplexing indication information to a UE which receives the one type of service, and sends resource scheduling indication information to a UE which receives the other type of service.

As different from block 304, in response to that the second resource is the resource scheduled by the base station for the other type of service in the target resource, the resource scheduling indication information is sent to the UE, so that the UE which receives the other type of service accurately receives the other type of service. The resource scheduling indication information contains the scheduled resource, and is used to indicate that the UE receives the other type of service on the scheduled resource.

In addition, the service multiplexing indication information can further be used to indicate whether the base station sends other type of service on the target resource, that is, whether a new type of service is transmitted. Moreover, in the embodiment of the present disclosure, the base station can send the service multiplexing indication information whether there is other type of service to be transmitted or not, and the UE determines whether the base station is to transmit a new type of service or not according to the received service multiplexing indication information.

For example, a length of the service multiplexing indication information can be 1 bit, and the content can be 0 or 1. 0 can be used to indicate that no other type of service is transmitted on the target resource, namely, no new type of service is transmitted. 1 can be used to indicate that other type of service is transmitted on the target resource, namely, a new type of service is transmitted. In practical, 1 can also be used to indicate that no new type of service is transmitted, and 0 can also be used to indicate that a new type of service is transmitted, which is not limited in the embodiment of the present disclosure.

In block 308, if the service multiplexing indication information sent by the base station is received in the process that the UE receives the one type of service based on all the resources of the target resource, the first resource and the second resource are determined in the target resource based on the service multiplexing indication information, and the one type of service is continued to be received based on the first resource.

In some embodiments, the base station can further send resource scheduling information for the UE which receives the other type of service to the UE which receives the one type of service, and the UE accurately determines the second resource. The resource scheduling information includes a time-domain resource position and/or a frequency-domain resource position of the second resource and the like.

It is to be noted that since only a case that the other type of service is sent to other UE by the base station is taken as an example in block 305, the UE only continues receiving the one type of service based on the first resource, namely, receiving the one type of service on a resource obtained by hopping a resource occupied by the other type of service on the resource originally used for receiving the one type of service. For convenient description, the UE which receives the one type of service is called a first UE and the UE which receives the other type of service is called a second UE hereinafter. For the second UE, when the second UE determines that the base station is to send other type of service to the second UE and receives the resource scheduling indication information sent by the base station, the second UE can determine the resource scheduled by the base station for the other type of service based on the resource scheduling indication information, and the other type of service is received on the determined resource.

In another embodiment, after the operation that the first resource and the second resource are determined in the target resource, the method further includes an operation as follows. In response to that the other type of service is also sent to the UE by the base station, the UE receives the other type of service based on the second resource in the process of continuing receiving the one type of service based on the first resource.

In the embodiment of the present disclosure, in response to that the base station is to send only one type of service, all the resources of the target resource can be used for sending the only one type of service. In response to that other type of service is to be sent, the second resource can be scheduled for the other type of service in the target resource, and the first resource in the target resource except the second resource can be determined in the target resource. The one type of service is continued to be sent based on the first resource, the other type of service is sent based on the second resource, and the service multiplexing indication information is sent to the UE which receives the service, so that the UE receives the service on the resource corresponding to the service. As such, different types of service can be dynamically transmitted on the same operation frequency band, thereby effectively improving a utilization rate of resources.

Figure 4A:
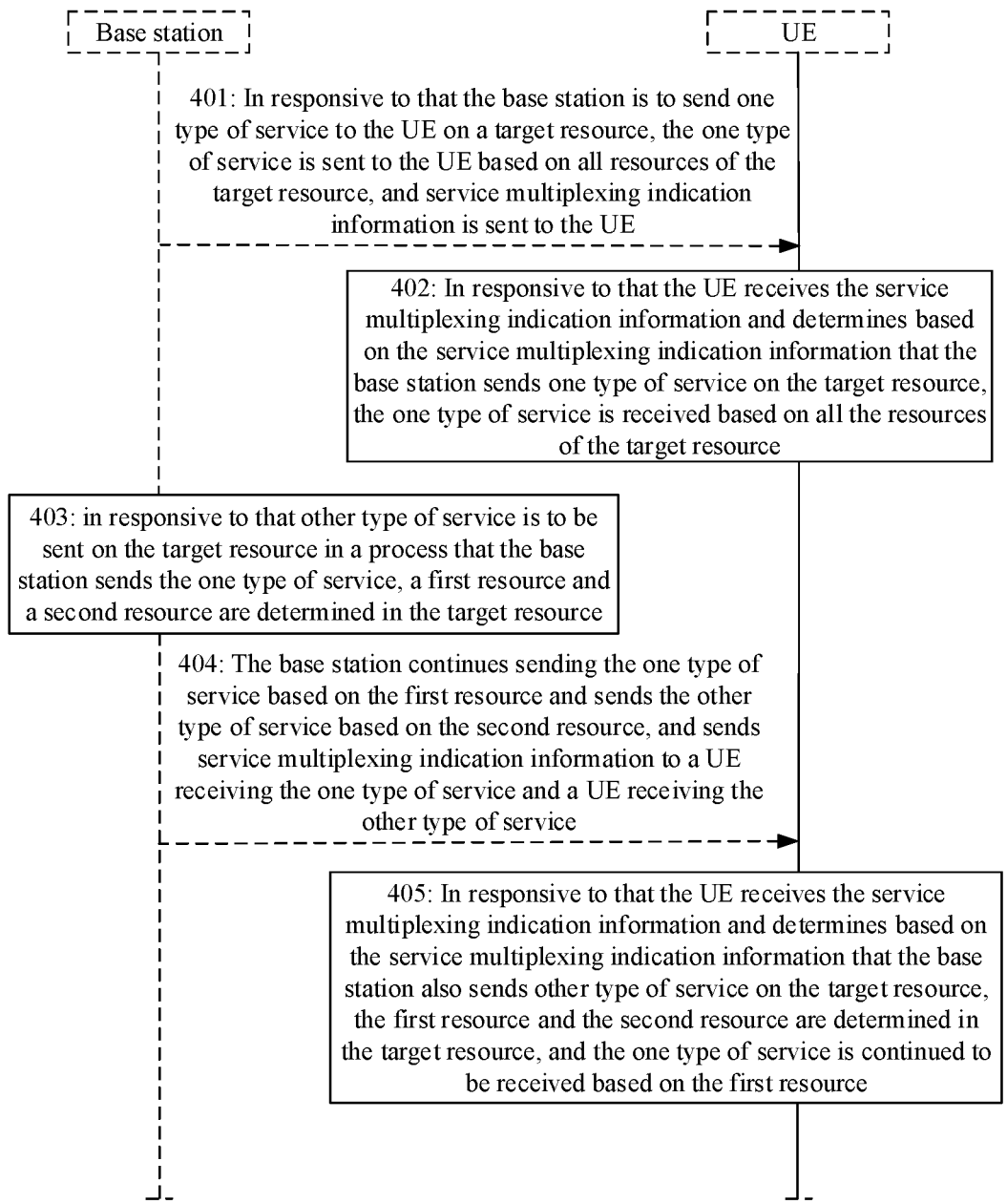
FIG. 4A is a flowchart showing another method for service multiplexing and transmission according to some embodiments of the present disclosure.

It is to be noted that only the following case is taken as an example in the embodiments shown in FIG. 3A and FIG. 3D: the service multiplexing indication information is used to indicate that the base station sends multiple types of service besides indicating the type of the service which is sent by the base station on the target resource, that is, no service multiplexing indication information is sent by the base station if one type of service is to be sent on the target resource, and service multiplexing indication information is sent by the base station only if multiple types of service are to be sent on the target resource. In another embodiment, the service multiplexing indication information can also only indicate the type of the service which is sent by the base station on the target resource rather than indicating that multiple types of service is sent. FIG. 4A is a flowchart showing another method for service multiplexing and transmission according to an exemplary embodiment. Interaction bodies of the method are a base station and a UE respectively. Referring to FIG. 4A, the method includes blocks 401 to 405.

In block 401, in response to that the base station is to send one type of service to the UE on a target resource, the one type of service is sent to the UE based on all resources of the target resource, and service multiplexing indication information is sent to the UE.

The target resource is a pre-configured resource capable of bearing multiple types of service, and the service multiplexing indication information is used to indicate a type of the service which is sent by the base station on the target resource.

That is, no matter whether one type of service or multiple types of service are to be sent on the target resource, the base station can send the service multiplexing indication information to the UE. The service multiplexing indication information includes the type of the sent service. For example, in response to that one type of service is to be sent, the sent service multiplexing indication information includes the type of the one type of service. In response to that multiple types of service are to be sent, the sent service multiplexing indication information includes types of the multiple types of service.

Therefore, whether the base station sends the multiple types of service on the target resource is determined by the UE according to the type contained in the received service multiplexing indication information.

In block 402, in response to that the UE receives the service multiplexing indication information and determines based on the service multiplexing indication information that the base station sends one type of service on the target resource, the one type of service is received based on all the resources of the target resource.

In response to that the UE receives the service multiplexing indication information and the service multiplexing indication information includes a type of the one type of service, the UE can determine that the base station sends only one type of service on the target resource, and thus receives the one type of service based on all the resources of the target resource.

In block 403, in response to that other type of service is to be sent on the target resource in a process that the base station sends the one type of service, a first resource and a second resource are determined in the target resource. The first resource is a resource in the target resource except the second resource, and the second resource is a resource pre-allocated to bear the other type of service in the target resource.

In block 404, the base station continues sending the one type of service based on the first resource and sends the other type of service based on the second resource, and sends service multiplexing indication information to a UE which receives the one type of service and a UE which receives the other type of service.

In block 405, in response to that the UE receives the service multiplexing indication information and determines based on the service multiplexing indication information that the base station also sends other type of service on the target resource, the first resource and the second resource are determined in the target resource, and the one type of service is continued to be received based on the first resource.

In response to that the UE receives the service multiplexing indication information and the service multiplexing indication information further includes the type of other type of service, it can be determined that the base station also sends the other type of service on the target resource.

In another embodiment, after the operation that the first resource and the second resource are determined in the target resource, the method further includes an operation as follows. If the other type of service is also sent to the UE by the base station, the UE receives the other type of service based on the second resource in a process of continuing receiving the one type of service based on the first resource.

It is to be noted that the embodiment shown in FIG. 4A is different from the embodiment shown in FIG. 3A only in that the manner of sending the service multiplexing indication information, and the other processes are similar. Therefore, for the other specific processes in FIG. 4A, reference can be made to above related descriptions about FIG. 3A, which is not described repeatedly here anymore.

In the embodiment of the present disclosure, in response to that the base station is to send only one type of service, all the resources of the target resource can be used for sending the only one type of service. In response to that other type of service is to be sent, the second resource used for bearing the other type of service can be determined in the target resource, and the first resource in the target resource except the second resource can be determined in the target resource. The one type of service is continued to be sent based on the first resource, and the other type of service is sent based on the second resource, and the service multiplexing indication information is sent to the UE which receives the service, so that the UE receives the service on the resource corresponding to the service. As such, different types of service can be dynamically transmitted on the same operation frequency band, thereby effectively improving a utilization rate of resources.

Figure 4B:
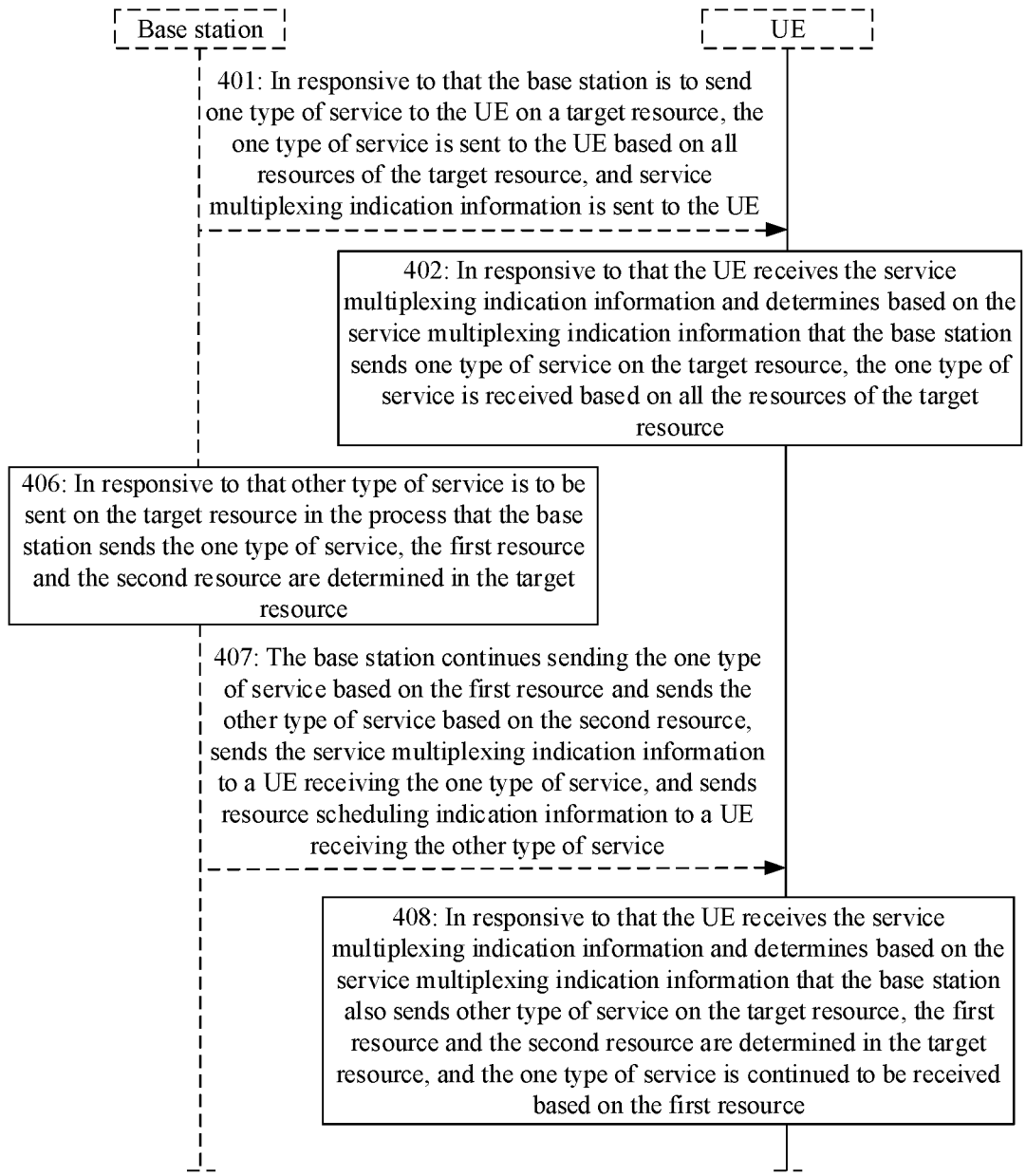
FIG. 4B is a flowchart showing another method for service multiplexing and transmission according to some embodiments of the present disclosure.

It is to be noted that only a case that, in response to that the base station is to send other type of service, the service pre-allocated to bear the other type of service is determined in the target resource and the other type of service is sent on the allocated resource is taken as an example in FIG. 4A. In another embodiment, when the base station is to send the other type of service, the base station can also randomly schedule a resource for the other type of service in the target resource and send the other type of service on the scheduled resource. That is, as shown in FIG. 4B, blocks 403 to 405 in the embodiment shown in FIG. 4A can also be replaced with blocks 406 to 408 below respectively.

In block 406, in response to that other type of service is to be sent on the target resource in the process that the base station sends the one type of service, the first resource and the second resource are determined in the target resource. The first resource is a resource in the target resource except the second resource, and the second resource is a resource scheduled for the other type of service in the target resource.

That is, the second resource is determined in a scheduling manner, rather than being pre-allocated.

In block 407, the base station continues sending the one type of service based on the first resource and sends the other type of service based on the second resource, sends the service multiplexing indication information to a UE which receives the one type of service, and sends resource scheduling indication information to a UE which receives the other type of service.

In block 408, in response to that the UE receives the service multiplexing indication information and determines based on the service multiplexing indication information that the base station also sends other type of service on the target resource, the first resource and the second resource are determined in the target resource, and the one type of service is continued to be received based on the first resource.

In another embodiment, after the operation that the first resource and the second resource are determined in the target resource, the method further includes an operation as follows. If the other type of service is also sent to the UE by the base station, the UE receives the other type of service based on the second resource in the process of continuing receiving the one type of service based on the first resource.

It is to be noted that the embodiment shown in FIG. 4B is different from the embodiment shown in FIG. 3D only in that the manner of sending the service multiplexing indication information, and the other processes are similar. Therefore, for the other specific processes in FIG. 4B, reference can be made to above related descriptions about FIG. 3D, which is not described repeatedly here anymore.

Figure 5:
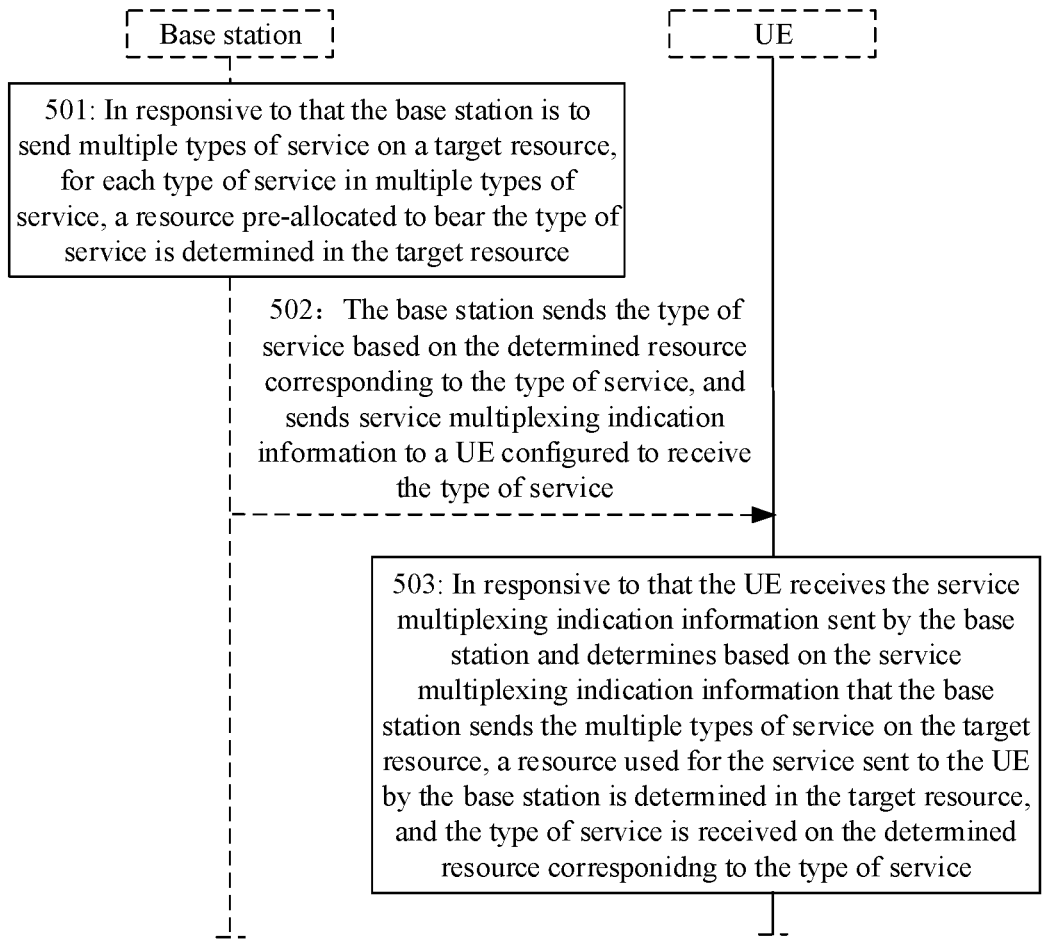
FIG. 5 is a flowchart showing another method for service multiplexing and transmission according to some embodiments of the present disclosure.

In the embodiment of the present disclosure, in response to that the base station is to send only one type of service, all the resources of the target resource can be used for sending the only one type of service. In response to that other type of service is to be sent, the second resource can be scheduled for the other type of service in the target resource, and the first resource in the target resource except the second resource can be determined in the target resource. The one type of service is continued to be sent based on the first resource, the other type of service is sent based on the second resource, and the service multiplexing indication information is sent to the UE which receives the service, so that the UE receives the service on the resource corresponding to the service. As such, different types of service can be dynamically transmitted on the same operation frequency band, thereby effectively improving a utilization rate of resources It is to be noted that only a case that the other type of service is to be sent in the process that the base station sends the one type of service is taken as an example in the abovementioned embodiments. In another embodiment, the base station can be to send multiple types of service when starting sending services. FIG. 5 is a flowchart showing a method for service multiplexing and transmission according to an exemplary embodiment. Interaction bodies of the method are a base station and a UE respectively. Referring to FIG. 5, the method includes blocks 501 to 503.

In block 501, in response to that the base station is to send multiple types of service on a target resource, for each type of service in multiple types of service, a resource pre-allocated to bear the type of service is determined in the target resource.

The base station can store a resource allocation list, and the resource allocation list stores multiple types of service and allocated resources corresponding to the multiple types of service. If the base station is to send multiple types of service, for each type of service in the multiple types of services, the resource allocation list can be searched for a resource pre-allocated to bear the type of service.

In block 502, the base station sends the type of service based on the determined resource corresponding to the type of service, and sends service multiplexing indication information to a UE which receives the type of service.

As shown in FIG. 3C, if a time-domain resource 3 is a resource pre-allocated to bear the eMBB service and a time-domain resource 4 is a resource pre-allocated to bear the URLLC service, when the base station sends the eMBB service and the URLLC service on the target resource shown in FIG. 3C, the eMBB service can be sent on the time-domain resource 3, and the URLLC service can be sent on the time-domain resource 4.

In block 503, in response to that the UE receives the service multiplexing indication information sent by the base station and determines based on the service multiplexing indication information that the base station sends the multiple types of service on the target resource, a resource used for the service which is sent to the UE by the base station is determined in the target resource, and the type of service is received on the determined resource corresponding to the type of service.

The UE can be any UE which is to receive a service. In response to that the UE determines that a new service is to be received and receives the service multiplexing indication information sent by the base station, whether the base station sends multiple type of service on the target resource can be determined based on the service multiplexing indication information. In response to that it is determined that the base station sends multiple types of service, the UE can determine a resource used for the service which is sent to the UE by the base station, i.e., a preset resource capable of bearing the service, and receive the service on the determined resource. In response to that it is determined that the base station sends one type of service, the UE can receive the service based on all the resources of the target resource.

Figure 6:
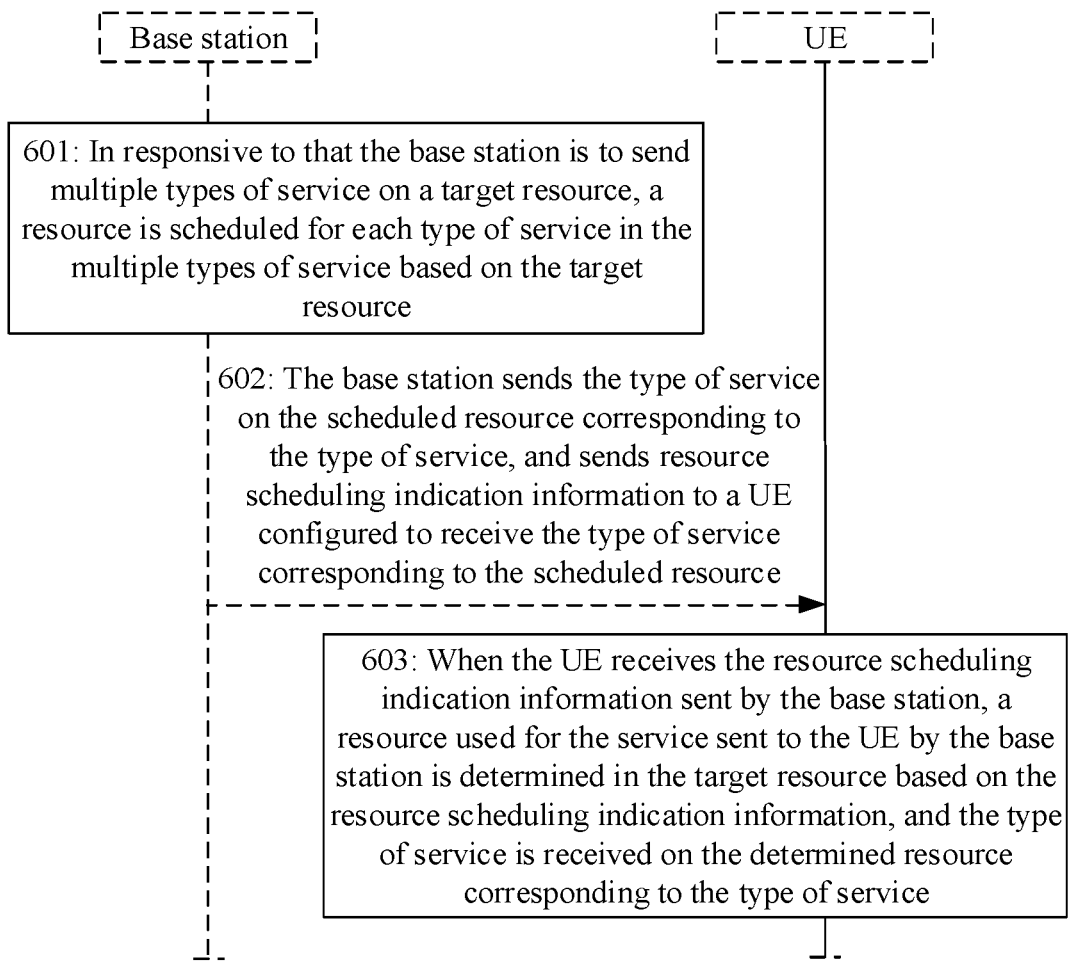
FIG. 6 is a flowchart showing another method for service multiplexing and transmission according to some embodiments of the present disclosure.

It is to be noted that only a case that, in response to that the base station is to send multiple types of services, for each type of service, the type of service is sent on the resource pre-allocated to bear the type of service is taken as an example in the embodiment shown in FIG. 5. In another embodiment, in response to that the base station is to send the multiple types of service, for each type of service, a resource can also be randomly scheduled for the type of service in the target resource, and the type of service is sent on the scheduled resource corresponding to the type of service. FIG. 6 is a flowchart showing a method for service multiplexing and transmission according to an exemplary embodiment. Interaction bodies of the method are a base station and a UE respectively. Referring to FIG. 6, the method includes blocks 601 to 603.

In block 601, in response to that the base station is to send multiple types of service on a target resource, a resource is scheduled for each type of service in the multiple types of service based on the target resource.

That is, in the embodiment of the present disclosure, in response to that the multiple types of service are to be sent on the target resource, for each type of service, the base station can dynamically schedule the resource used to send the type of service in the target resource for the type of service, rather than pre-allocating the resource for the type of service.

In block 602, the base station sends the type of service on the scheduled resource corresponding to the type of service, and sends resource scheduling indication information to a UE which receives the type of service.

The resource scheduling indication information is used to indicate the scheduled resource for the type of service which is sent to the UE, so that the UE receives the type of service on the scheduled resource corresponding to the type of service.

In block 603, in response to that the UE receives the resource scheduling indication information sent by the base station, a resource used for the service which is sent to the UE by the base station is determined in the target resource based on the resource scheduling indication information, and the type of service is received on the determined resource corresponding to the scheduled resource.

Figure 7A:
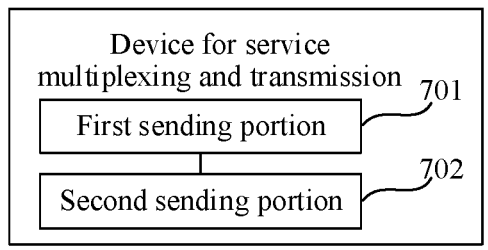
FIG. 7A is a block diagram of a device for service multiplexing and transmission according to some embodiments of the present disclosure.

FIG. 7A is a block diagram of a device for service multiplexing and transmission according to an exemplary embodiment. The device can be a base station and other device in a communication system. As shown in FIG. 7A, the device includes a first sending portion 701 and a second sending portion 702.

The various device components, units, blocks, or portions can have modular configurations, or are composed of discrete components, but nonetheless can be referred to as "modules" in general. In other words, the "components," "modules" or "units" referred to herein may or may not be in modular forms.

The first sending portion 701 is configured to, in response to that one type of service is to be sent on a target resource, send the one type of service based on all resources of the target resource, The target resource is a pre-configured resource capable of bearing multiple types of service.

The second sending portion 702 is configured to, in response to that multiple types of service are to be sent on the target resource, for each type of service in multiple types of service, determine a resource pre-allocated to bear the type of service in the target resource, send the type of service based on the determined resource corresponding to the type of service, and send service multiplexing indication information to a UE which receives the type of service.

The service multiplexing indication information is used to indicate a type of the service which is sent by the base station on the target resource.

In the embodiment of the present disclosure, in response to the base station is to send only one type of service, all the resources of the target resource can be used for sending the only one type of service. In response to that multiple types of service are to be sent, for each type of service, a resource pre-allocated to bear the type of service can be determined in the target resource, the type of service is sent based on the determined resource corresponding to the type of service, and the service multiplexing indication information is sent to the UE which receives the type of service, so that the UE receives the service on the resource corresponding to the service. In such a manner, occupied resources can be dynamically regulated according to the number of types of sent services, thereby avoiding the resources from being idle, and improving a utilization rate of the resources.

Figure 7B:
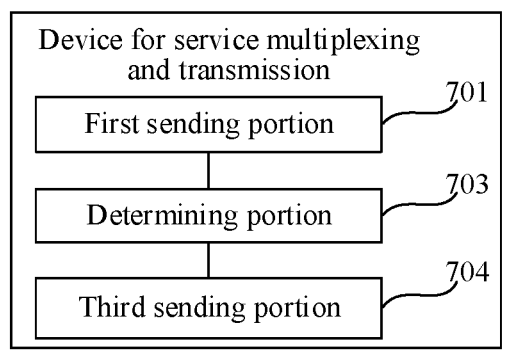
FIG. 7B is a block diagram of a device for service multiplexing and transmission according to some embodiments of the present disclosure.

In some embodiments, referring to FIG. 7B, the device further includes a determining portion 703 and a third sending portion 704.

The determining portion 703 is configured to, in response to that other type of service is to be sent on the target resource in a process of sending the one type of service, determine a first resource and a second resource in the target resource.

The first resource is a resource in the target resource except the second resource, and the second resource is a resource pre-allocated to bear the other type of service in the target resource.

The third sending portion 704 is configured to continue sending the one type of service based on the first resource and send the other type of service based on the second resource, and send the service multiplexing indication information to a UE which receives the one type of service and a UE which receives the other type of service.

Figure 7C:
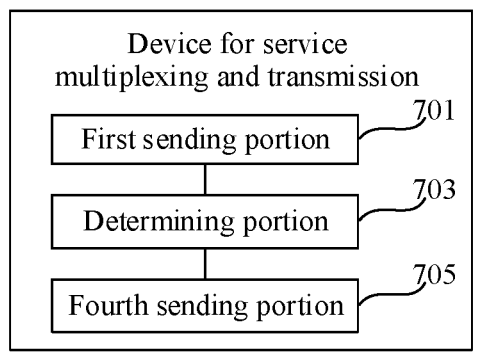
FIG. 7C is a block diagram of a device for service multiplexing and transmission according to some embodiments of the present disclosure.

In some embodiments, referring to FIG. 7C, the device further includes a determining portion 703 and a fourth sending portion 705.

The determining portion 703 is configured to, in response to that other type of service is to be sent on the target resource in a process of sending the one type of service, determine a first resource and a second resource in the target resource.

The first resource is a resource in the target resource except the second resource, and the second resource is a resource scheduled for the other type of service in the target resource.

The fourth sending portion 705 is configured to continue sending the one type of service based on the first resource and send the other type of service based on the second resource, send the service multiplexing indication information to the UE which receives the one type of service and send resource scheduling indication information to the UE which receives the other type of service.

Figure 7D:
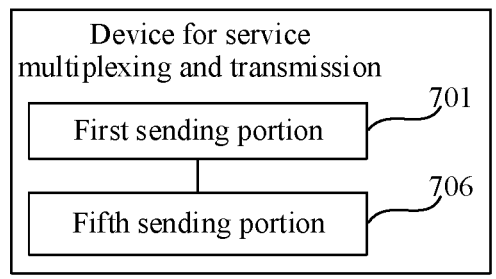
FIG. 7D is a block diagram of a device for service multiplexing and transmission according to some embodiments of the present disclosure.

In some embodiments, referring to FIG. 7D, the device further includes a fifth sending portion 706.

The fifth sending portion 706 is configured to send the service multiplexing indication information to the UE which receives the one type of service.

In some embodiments, the target resource includes a frequency-domain resource and/or a time-domain resource.

In some embodiments, the service multiplexing indication information is sent to the UE which receives the type of service through system information, high-layer signaling, a channel or a protocol. The high-layer signaling includes RRC signaling, MAC signaling or physical-layer signaling.

Figure 8A:
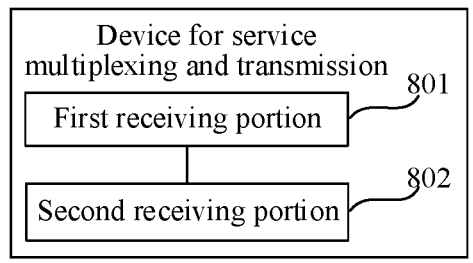
FIG. 8A is a block diagram of a device for service multiplexing and transmission according to some embodiments of the present disclosure.

FIG. 8A is a block diagram of a device for service multiplexing and transmission according to an exemplary embodiment. The device can be a UE such as a mobile phone and a tablet computer. As shown in FIG. 8A, the device includes a first receiving portion 801 and a second receiving portion 802.

The first receiving portion 801 is configured to, in response to that no service multiplexing indication information sent by a base station is received or the service multiplexing indication information is received and it is determined based on the service multiplexing indication information that the base station sends one type of service on a target resource, receive the one type of service based on all resources of the target resource. The target resource is a resource pre-configured by the base station and capable of bearing multiple types of service.

The second receiving portion 802 is configured to, in response to that the service multiplexing indication information sent by the base station is received and it is determined based on the service multiplexing indication information that the base station sends multiple types of service on the target resource, determine a resource used for the service which is sent to the UE by the base station in the target resource and receive the type of service on the determined resource corresponding to the type of service.

In the embodiment of the present disclosure, in response to that the base station is to send only one type of service, the UE can receive the one type of service based on all resources of the target resource. In response to that the base station is to send multiple types of service, the UE can determine a resource used for the service which is sent to the UE by the base station in the target resource and receive the type of service on the determined resource corresponding to the type of service. In such a manner, the base station can dynamically regulate occupied resources according to the number of types of sent services, thereby avoiding the resources from being idle, and improving a utilization rate of the resources.

Figure 8B:
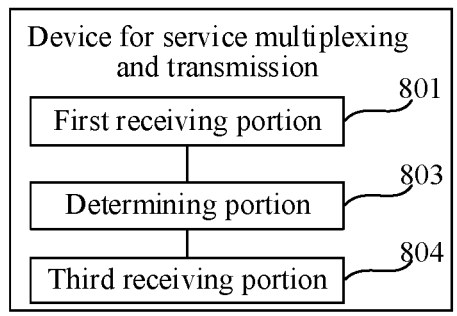
FIG. 8B is a block diagram of a device for service multiplexing and transmission according to some embodiments of the present disclosure.

In some embodiments, referring to FIG. 8B, the device further includes a determining portion 803 and a third receiving portion 804.

The determining portion 803 is configured to, in a process of receiving the one type of service based on all the resources of the target resource, if the service multiplexing indication information sent by the base station is received, or the service multiplexing indication information is received and it is determined based on the service multiplexing indication information that the base station also sends other type of service on the target resource, determine a first resource and a second resource in the target resource, The first resource is a resource in the target resource except the second resource, and the second resource is a resource pre-allocated to bear the other type of service in the target resource or a resource scheduled for the other type of service in the target resource.

The third receiving portion 804 is configured to continue receiving the one type of service based on the first resource.

Figure 8C:
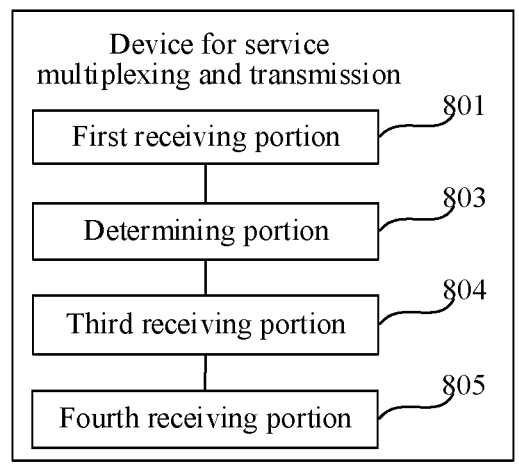
FIG. 8C is a block diagram of a device for service multiplexing and transmission according to some embodiments of the present disclosure.

In some embodiments, referring to FIG. 8C, the device further includes a fourth receiving portion 805.

The fourth receiving portion 805 is configured to, in response to that the other type of service is also sent to the UE by the base station, receive the other type of service based on the second resource in a process of continuing receiving the one type of service based on the first resource.

In some embodiments, the target resource includes a frequency-domain resource and/or a time-domain resource.

In some embodiments, the service multiplexing indication information is received through system information, high-layer signaling, a channel or a protocol. The high-layer signaling includes RRC signaling, MAC signaling or physical-layer signaling.

Figure 9:
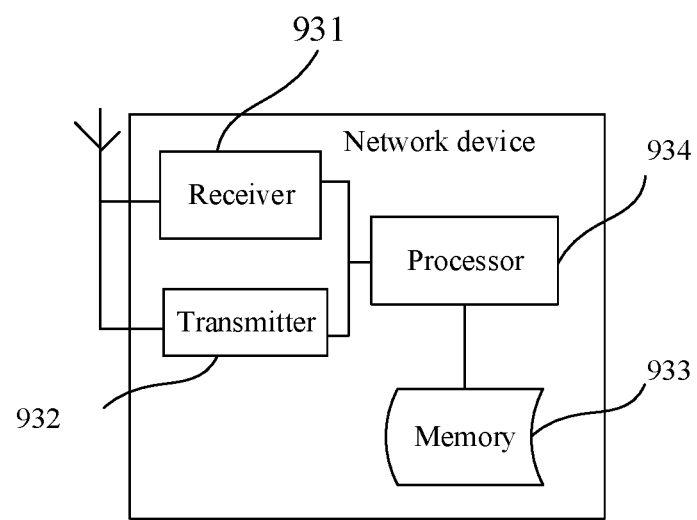
FIG. 9 is a schematic structural diagram of a base station according to some embodiments of the present disclosure.

FIG. 9 is a schematic structural diagram of a base station according to an exemplary embodiment. The base station is configured to implement the method for service multiplexing and transmission provided in the present disclosure, and includes a receiver 931, a transmitter 932, a memory 933, and a processor 934 which is connected with the receiver 931, the transmitter 932 and the memory 933. The processor 934 is configured to execute the methods provided in the embodiments shown in FIG. 1C to FIG. 6.

In an exemplary embodiment, a non-transitory computer-readable storage medium including an instruction is further provided, such as the memory 933 including an instruction, and the above instruction can be executed by the processor 934 of the base station to implement the methods in the embodiments shown in FIG. 1C to FIG. 6. For example, the non-transitory computer-readable storage medium can be a read-only memory (ROM), a random-access memory (RAM), a compact disc read-only memory (CD-ROM), a magnetic tape, a floppy disc, an optical data storage device and the like.

With the non-transitory computer-readable storage medium, when an instruction in the storage medium is executed by the processor of the base station, the base station can execute the methods for service multiplexing and transmission provided in the embodiments shown in FIG. 1C to FIG. 6.

Figure 10:
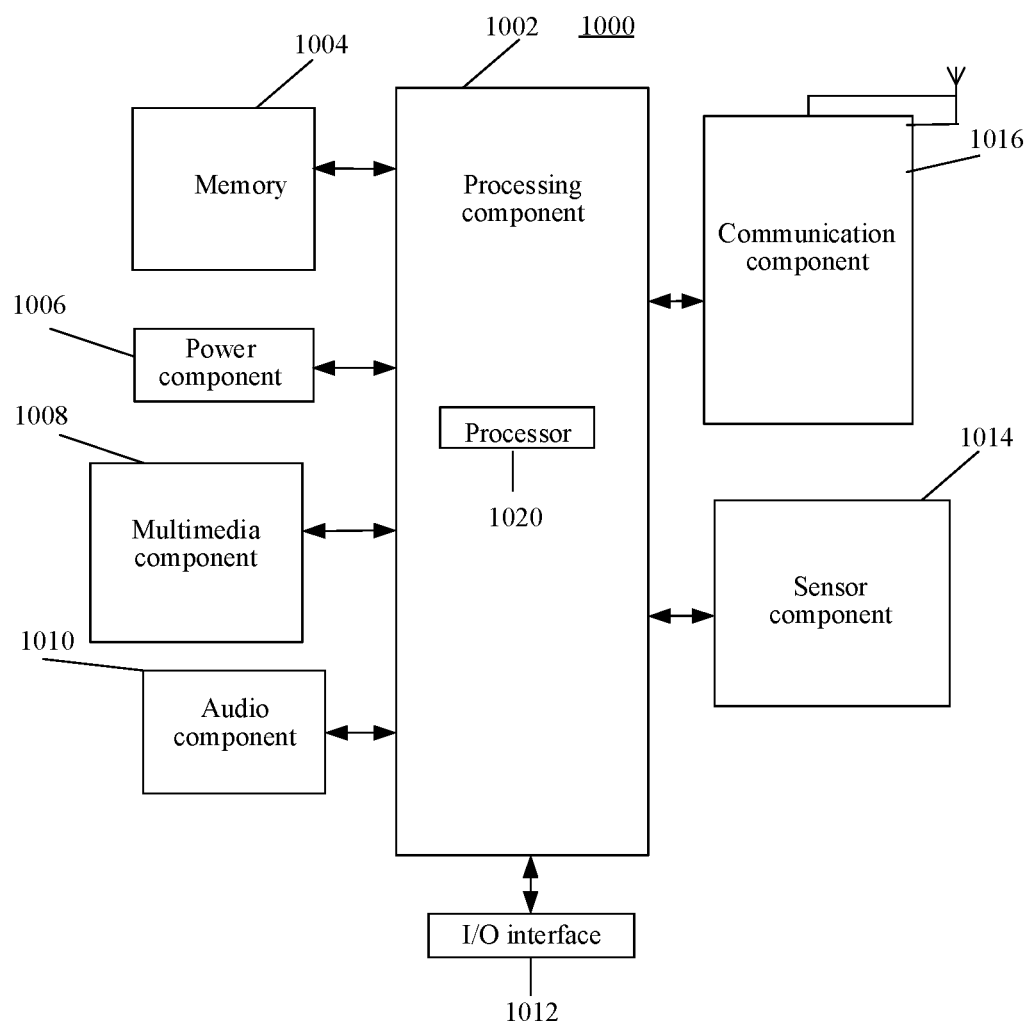
FIG. 10 is a schematic structural diagram of a UE according to some embodiments of the present disclosure.

FIG. 10 is a schematic structural diagram of a UE 1000 according to an exemplary embodiment. For example, the UE 1000 can be a mobile phone, a computer, a digital broadcast terminal, a messaging device, a gaming console, a tablet, a medical device, fitness equipment, a personal digital assistant, and the like.

Referring to FIG. 10, the UE 1000 can include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the UE 1000, such as the operations associated with display, telephone calls, data communications, camera operations, and recording operations. The processing component 1002 can include one or more processors 1020 to execute instructions to perform all or a part of the blocks in the above described methods. Moreover, the processing component 1002 can include one or more portions which facilitate interaction between the processing component 1002 and other components. For example, the processing component 1002 can include a multimedia portion to facilitate interaction between the multimedia component 1008 and the processing component 1002.

The memory 1004 is configured to store various types of data to support the operation of the UE 1000. Examples of such data include instructions for any applications or methods operated on the UE 1000, contact data, telephone book data, messages, pictures, video and the like. The memory 1004 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1006 provides power to various components of the UE 1000. The power component 1006 can include a power management system, one or more power sources, and other components associated with the generation, management, and distribution of power for the UE 1000.

The multimedia component 1008 includes a screen providing an output interface between the UE 1000 and the user. In some embodiments, the screen can include a liquid crystal display (LCD) and a touch panel (TP).

To provide for interaction with a user, implementations of the subject matter described in this specification can be implemented with a computer and/or a display device that is not limited to a LCD display. For example, a VR/AR device, a head-mount display (HMD) device, a head-up display (HUD) device, smart eyewear (e.g., glasses), a CRT (cathode-ray tube), an OLED (organic light emitting diode) dos[;au, or any other monitor for displaying information to the user can be employed. Other peripheral devices, such as a keyboard, a pointing device, e.g., a mouse, trackball, etc., can be provided for the user to provide input to the computer.

If the screen includes the touch panel, the screen can be implemented as a touch screen to receive input signals from the user. The touch panel includes one or more touch sensors to sense touching, sliding, and gestures on the touch panel. The touch sensors can not only sense a boundary of a touching or sliding action, but also sense a period of time and a pressure associated with the touching or sliding operation. In some embodiments, the multimedia component 1008 includes a front camera and/or a rear camera. The front camera and the rear camera can receive external multimedia datum in a case that the UE 1000 is in an operation mode, such as a photographing mode or a video mode. Each of the front camera and the rear camera can be a fixed optical lens system or have a focus length and optical zoom capability.

The audio component 1010 is configured to output and/or input audio signals. For example, the audio component 1010 includes a microphone ("MIC") configured to receive an external audio signal when the UE 1000 is in an operation mode, such as a call mode, a recording mode, and a voice recognition mode. The received audio signal can be further stored in the memory 1004 or transmitted via the communication component 1016. In some embodiments, the audio component 1010 further includes a speaker to output audio signals.

The I/O interface 1012 provides an interface between the processing component 1002 and a peripheral interface portion. The above peripheral interface portion can be a keyboard, a click wheel, a button, and the like. The button can include, but be not limited to, a home button, a volume button, a starting button, and a locking button.

The sensor component 1014 includes one or more sensors configured to provide status assessments for the UE 1000 in various aspects. For example, the sensor component 1014 can detect an open/closed status of the UE 1000 and positioning of components, for example, the component is the display and the keypad of the UE 1000. The sensor component 1014 can also detect a change in position of the UE 1000 or a component of the UE 1000, contact or non-contact of a user with the UE 1000, an orientation or an acceleration/deceleration of the UE 1000, and a change in temperature of the UE 1000. The sensor component 1014 can include a proximity sensor configured to detect the presence of nearby objects without any physical contact. The sensor component 1014 can also include a light sensor, such as a complementary metal oxide semiconductor (CMOS) or charge-coupled device (CCD) image sensor, which is used in imaging applications. In some embodiments, the sensor component 1014 can also include an accelerometer sensor, a gyroscope sensor, a magnetic sensor, a pressure sensor, or a temperature sensor.

The communication component 1016 is configured to facilitate wired or wireless communication between the UE 1000 and other devices. The UE 1000 can access a wireless network based on a communication standard, such as wireless fidelity (Wi-Fi), the $2^{nd}$ generation (2G), the $3^{rd}$ generation (3G), the $4^{th}$ generation (4G), the $5^{th}$ generation (5G), or a combination thereof.

In one exemplary embodiment, the communication component 1016 receives a broadcast signal or broadcast associated information from an external broadcast management system via a broadcast channel. In one exemplary embodiment, the communication component 1016 further includes a near field communication (NFC) portion to facilitate short-range communications. For example, the NFC portion can be implemented based on a radio frequency identification (RFID) technology, an infrared data association (IrDA) technology, an ultra-wideband (UWB) technology, a bluetooth (BT) technology, and other technologies.

In exemplary embodiments, the UE 1000 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods shown in FIG. 1C to FIG. 6.

Various embodiments of the present disclosure can have one or more of the following advantages.

For example, in response to that the base station is to send only one type of service, all the resources of the target resource can be used for sending the one type of service. In response to that multiple types of service are to be sent, for each type of service, the resource pre-allocated to bear the type of service can be determined in the target resource, then the type of service is sent based on the determined resource corresponding to the type of service, and the service multiplexing indication information is sent to the UE which receives the type of service, so that the UE receives the service on the resource corresponding to the type of service. As such, occupied resources can be dynamically regulated according to the number of types of sent services, thereby avoiding resources from being idle, and improving a utilization rate of the resources.

In some embodiments, a non-transitory computer readable storage medium is provided having instructions stored thereon, such as the memory 1004 including instructions. The instructions can be executable by the processor 1020 in the UE 1000, for performing the above-described methods executed by the UE. For example, the non-transitory computer-readable storage medium can be a read-only memory (ROM), a read access memory (RAM), a compact disk-read only memory (CD-ROM), a magnetic tape, a floppy disc, an optical data storage device, and the like.

The non-transitory computer-readable storage medium can have an instruction stored therein for execution by a processor of the UE, causing the UE to execute the methods for service multiplexing and transmission provided in the embodiments shown in FIG. 1C to FIG. 6.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

The above is only the preferred embodiment of the present disclosure and not intended to limit the present disclosure. Any modifications, equivalent replacements, improvements and the like made within the spirit and principle of the present disclosure shall fall within the scope of protection of the present disclosure.

The invention claimed is:

1. A method performed by a base station for service multiplexing and transmission, the method comprising:
when one type of service is to be sent on a target resource, sending, by the base station, the one type of service based on all resources of the target resource, with the target resource being a pre-configured resource capable of bearing multiple types of service; and
when multiple types of service are to be sent on the target resource, for each type of service in the multiple types of service, determining, by the base station, a resource pre-allocated to bear the type of service in the target resource, sending, by the base station, the type of service based on the determined resource corresponding to the type of service, and sending, by the base station, service multiplexing indication information to a user equipment (UE) which receives the type of service, wherein the service multiplexing indication information comprises a bit for indicating the type of a service, which is sent by the base station on the target resource, wherein a resource allocation list is stored in each of the UE and the base station, and comprises the multiple types of service and allocated resources corresponding to the multiple types of service, the base station searches the service of the multiple types of service when the multiple types of service is to be sent, and the UE determines, for each type of service of the multiple types of service, the resource on which the type of service is bear according to the stored resource allocation list upon receiving the service multiplexing indication information.

2. The method of claim 1, further comprising: after the one type of service is sent on the target resource, when other type of service is to be sent on the target resource in a process of sending the one type of service, determining, by the base station, a first resource and a second resource in the target resource, with the first resource being a resource in the target resource except the second resource, and the second resource being a resource pre-allocated to bear the other type of service in the target resource; and continuing sending, by the base station, the one type of service based on the first resource, sending, by the base station, the other type of service based on the second resource, and sending, by the base station, the service multiplexing indication information to a UE which receives the one type of service and a UE which receives the other type of service.

3. The method of claim 2, wherein the service multiplexing indication information is further used to indicate that the base station sends the other type of service on the target resource.

4. The method of claim 1, further comprising: after the one type of service is sent on the target resource, when other type of service is to be sent on the target resource in a process of sending the one type of service, determining, by the base station, a first resource and a second resource in the target resource, with the first resource being a resource in the target resource except the second resource, and the second resource being the resource scheduled for the other type of service in the target resource; and continuing sending, by the base station, the one type of service based on the first resource, sending, by the base station, the other type of service based on the second resource, sending, by the base station, the service multiplexing indication information to a UE which receives the one type of service, and sending, by the base station, resource scheduling indication information to a UE which receives the other type of service.

5. The method of claim 4, wherein the service multiplexing indication information is further used to indicate that the base station sends the other type of service on the target resource.

6. The method of claim 1, wherein the target resource comprises at least a frequency-domain resource or a time-domain resource.

7. The method of claim 1, wherein the service multiplexing indication information is sent to a UE which receives a type of service through system information, high-layer signaling, physical-layer signaling or a protocol, and the high-layer signaling comprises radio resource control (RRC) signaling and media access control (MAC) signaling.

8. A device for service multiplexing and transmission, applied to a base station and comprising:

a processor;
a memory configured to store a processor-executable instruction; and
a transmitter;

wherein the processor is configured to:

when one type of service is to be sent on a target resource, control the transmitter to send the one type of service based on all resources of the target resource, with the target resource being a pre-configured resource capable of bearing multiple types of service; and when multiple types of service are to be sent on the target resource, for each type of service in the multiple types of service, determine a resource pre-allocated to bear the type of service in the target resource, control the transmitter to send the type of service based on the determined resource corresponding to the type of service, and send service multiplexing indication information to a user equipment (UE) which receives the type of service, wherein the service multiplexing indication information comprises a bit for indicating a type of a service, which is sent by the base station on the target resource, wherein a resource allocation list is stored in each of the UE and the base station, and comprises the multiple types of service and allocated resources corresponding to the multiple types of service, the processor is configured to search the stored resource allocation list for a resource pre-allocated to bear each type of service of the multiple types of service when the multiple types of service is to be sent, and the UE determines, for each type of service of the multiple types of service, the resource on which the type of service is bear according to the stored resource allocation list upon receiving the service multiplexing indication information.

9. The device of claim 8, wherein the processor is further configured to:

after the one type of service is sent on the target resource, when other type of service is to be sent on the target resource in a process of sending the one type of service, determine a first resource and a second resource in the target resource, with the first resource being a resource in the target resource except the second resource, and the second resource being a resource pre-allocated to bear the other type of service in the target resource; and control the transmitter to continue sending the one type of service based on the first resource, send the other type of service based on the second resource, and send the service multiplexing indication information to a UE which receives the one type of service and a UE which receives the other type of service.

10. The device of claim 9, wherein the service multiplexing indication information is further used to indicate that the base station sends the other type of service on the target resource.

11. The device of claim 8, wherein the processor is further configured to:

after the one type of service is sent on the target resource, when other type of service is to be sent on the target resource in a process of sending the one type of service, determine a first resource and a second resource in the target resource, with the first resource being a resource in the target resource except the second resource, and the second resource being the resource scheduled for the other type of service in the target resource; and control the transmitter to continue sending the one type of service based on the first resource, send the other type of service based on the second resource, send the service multiplexing indication information to a UE which receives the one type of service, and send resource scheduling indication information to a UE which receives the other type of service.

12. The device of claim 8, wherein the target resource comprises at least a frequency-domain resource or a time-domain resource.

13. The device of claim 8, wherein the service multiplexing indication information is sent to a UE which receives a type of service through system information, high-layer signaling, physical-layer signaling or a protocol, and the high-layer signaling comprises radio resource control (RRC) signaling and media access control (MAC) signaling.

14. A device for service multiplexing and transmission, applied to a user equipment (UE) and comprising:
   a processor;
   a memory configured to store a processor-executable instruction; and
   an input/output interface,
   wherein the processor is configured to:
   when no service multiplexing indication information sent by a base station is received, or the service multiplexing indication information is received and it is determined based on the service multiplexing indication information that the base station sends only one type of service on a target resource, control the input/output interface to receive the one type of service based on all resources of the target resource, with the target resource being a resource pre-configured by the base station and capable of bearing multiple types of service; and
   when service multiplexing indication information sent by the base station is received and it is determined based on the service multiplexing indication information that the base station sends multiple types of service on the target resource, determine a resource used for a service which is sent to the UE by the base station in the target resource, and control the input/output interface to receive a type of service on the determined resource corresponding to the type of service wherein the service multiplexing indication information comprises a bit for indicating a type of a service, which is sent by the base station on the target resource,
   wherein a resource allocation list is stored in each of the UE and the base station, and comprises the multiple types of service and allocated resources corresponding to the multiple types of service, the base station searches the stored resource avocation list for a resource pre-allocated to bear each type of service of the multiple types of service when the multiple types of service is to be sent, and the UE determines, for each type of service of the multiple types of service, the resource on which the type of service is bear according to the stored resource allocation list upon receiving the service multiplexing indication information.

15. The device of claim 14, wherein the processor is configured to:
   in a process of receiving the one type of service based on all resources of the target resource, if the service multiplexing indication information sent by the base station is received, or the service multiplexing indication information is received and it is determined based on the service multiplexing indication information that the base station also sends other type of service on the target resource, determine a first resource and a second resource in the target resource,
   with the first resource being a resource in the target resource except the second resource, and the second resource being a resource pre-allocated to bear other type of service in the target resource or a resource scheduled for the other type of service in the target resource; and
   control the input/output interface to continue receiving the one type of service based on the first resource.

16. The device of claim 15, wherein the processor is configured to, after the determining the first resource and the second resource in the target resource,
   if the other type of service is sent to the UE by the base station, control the input/output interface to receive the other type of service based on the second resource in a process of continuing receiving the one type of service based on the first resource.

17. The device of claim 14, wherein the target resource comprises at least a frequency-domain resource or a time-domain resource.

18. The device of claim 14, wherein the service multiplexing indication information is received through system information, high-layer signaling, physical-layer signaling or a protocol, and the high-layer signaling comprises radio resource control (RRC) signaling and media access control (MAC) signaling.

* * * * *